United States Patent
Fisher et al.

(10) Patent No.: US 10,082,962 B2
(45) Date of Patent: *Sep. 25, 2018

(54) WEAR LEVELING OF A MEMORY ARRAY

(71) Applicant: INTERNATIONAL BUSINESS MACHINES CORPORATION, Armonk, NY (US)

(72) Inventors: Timothy J. Fisher, Cypress, TX (US); Aaron D. Fry, Richmond, TX (US); Nikolas Ioannou, Zurich (CH); Ioannis Koltsidas, Zurich (CH); Jason Ma, Sugar Land, TX (US); Roman A. Pletka, Zurich (CH); Lincoln T. Simmons, Houston, TX (US); Sasa Tomic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,877

(22) Filed: Nov. 24, 2017

(65) Prior Publication Data

US 2018/0121094 A1    May 3, 2018

Related U.S. Application Data

(63) Continuation of application No. 14/788,022, filed on Jun. 30, 2015, now Pat. No. 9,857,986.

(51) Int. Cl.
*G06F 3/06* (2006.01)
*G06F 12/02* (2006.01)

(52) U.S. Cl.
CPC .......... *G06F 3/061* (2013.01); *G06F 3/0655* (2013.01); *G06F 3/0688* (2013.01); *G06F 12/0246* (2013.01); *G06F 2212/7211* (2013.01)

(58) Field of Classification Search
CPC ...... G06F 3/061; G06F 3/0655; G06F 3/0688; G06F 12/0246; G06F 2212/7211
See application file for complete search history.

(56) References Cited

U.S. PATENT DOCUMENTS

| | | |
|---|---|---|
| 7,856,528 B1 | 12/2010 | Frost et al. |
| 8,176,284 B2 | 5/2012 | Frost et al. |
| 8,176,360 B2 | 5/2012 | Frost et al. |
| 8,402,201 B2 | 3/2013 | Flynn et al. |
| 8,443,136 B2 | 5/2013 | Frost et al. |
| 8,621,145 B1 | 12/2013 | Kimmel et al. |

(Continued)

OTHER PUBLICATIONS

Hu, Y., Jiang, H., Feng, D., et al. (2013). Exploring and exploiting the multilevel parallelism inside SSDs for improved performance and endurance. IEEE Transactions on Computers, 62(6), 1141-1155.

(Continued)

*Primary Examiner* — Rocio Del Mar Perez-Velez
(74) *Attorney, Agent, or Firm* — Brian F. Russell; Randall J. Bluestone

(57) ABSTRACT

In at least one embodiment, a controller of a non-volatile memory array including a plurality of subdivisions stores write data within the non-volatile memory array utilizing a plurality of block stripes of differing numbers of blocks, where all of the blocks within each block stripe are drawn from different ones of the plurality of subdivisions. The controller builds new block stripes for storing write data from blocks selected based on estimated remaining endurances of blocks in each of the plurality of subdivisions.

16 Claims, 13 Drawing Sheets

(56) References Cited

U.S. PATENT DOCUMENTS

| | | |
|---|---|---|
| 8,631,273 B2 | 1/2014 | Frost et al. |
| 8,631,274 B2 | 1/2014 | Frost et al. |
| 8,775,772 B2 | 7/2014 | Fuxa et al. |
| 8,832,507 B2 | 9/2014 | Post et al. |
| 9,128,871 B2 | 9/2015 | Frost et al. |
| 2010/0146187 A1 | 6/2010 | Grimsrud et al. |
| 2011/0066793 A1 | 3/2011 | Burd et al. |
| 2013/0073822 A1 | 3/2013 | Sandel et al. |
| 2013/0145091 A1 | 6/2013 | Klemm et al. |
| 2014/0040681 A1 | 2/2014 | Wolfman et al. |
| 2014/0181595 A1 | 6/2014 | Hoang et al. |
| 2014/0281121 A1 | 9/2014 | Karamcheti et al. |
| 2014/0310574 A1 | 10/2014 | Yu et al. |
| 2016/0004458 A1 | 1/2016 | Micheloni et al. |
| 2016/0062881 A1 | 3/2016 | Chen et al. |
| 2016/0170682 A1 | 6/2016 | Bakshi et al. |

OTHER PUBLICATIONS

Chang, Y. B., & Chang, L. P. (Mar. 2008). A self-balancing striping scheme for NAND-flash storage systems. Proceedings of the 2008 ACM symposium on Applied Computing, 1715-1719. ACM. (On Order).

Xavier Jimenez et al. "Wear Unleveling: Improving NAND Flash Lifetime by Balancing Page endurance" Usenix Conference on File and Storage Technologies, Feb. 2014.

Fisher et al. "Wear Leveling of a Memory Array", U.S. Appl. No. 14/788,022, filed Jun. 30, 2015, Non-Final Office Action dated Sep. 26, 2016.

Fisher et al. "Wear Leveling of a Memory Array", U.S. Appl. No. 14/788,022, filed Jun. 30, 2015, Final Office Action dated Apr. 4, 2017.

Fisher et al. "Wear Leveling of a Memory Array", U.S. Appl. No. 14/788,022, filed Jun. 30, 2015, Notice of Allowance dated Aug. 24, 2017.

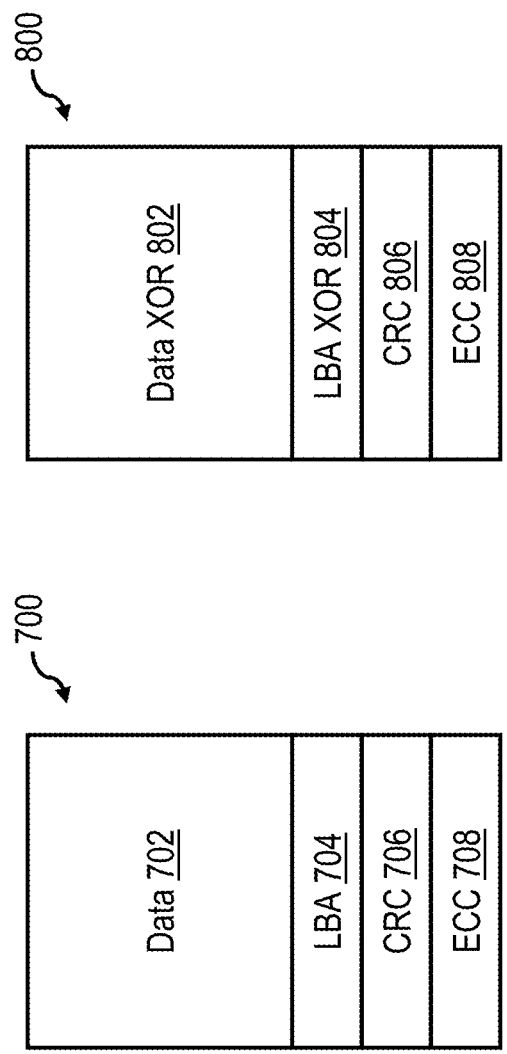

WEAR LEVELING OF A MEMORY ARRAY

BACKGROUND OF THE INVENTION

This disclosure relates to data processing and storage, and more specifically, to management of a data storage system, such as a flash memory system, to promote storage system endurance through wear leveling.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Over time, the high voltages applied during the program and erase operations tend to degrade the gate oxide of the floating gates of the transistors forming the memory cells of the blocks. This damage to the memory cells, often referred to as "wear," limits the useful lifetime (or "endurance") of blocks of NAND flash memory, where endurance is typically expressed as the number of program/erase (P/E) cycles for which a block can be utilized prior to the number of errors occurring in the block reaching the level that the block is no longer useful for storing data. Given the limited endurance of the various blocks of flash memory comprising a data storage system, one function of flash controllers is to maximize the useful lifetime of the overall data storage system by extending the endurance of the constituent blocks.

Among the techniques flash controllers commonly employ to extend endurance of flash-based data storage systems is wear leveling. Wear leveling attempts to equalize the wear of the blocks across a data storage system. Various prior art wear leveling techniques have experienced various levels of success in equalizing wear.

BRIEF SUMMARY

In at least one embodiment, a technique for wear leveling is implemented at least when building block stripes for storing data.

In at least one embodiment, the wear leveling is performed based on at least estimated remaining block endurance.

In various embodiments, the wear leveling technique may be implemented as a system, a method, and/or a computer program product.

In at least one embodiment, a controller of a non-volatile memory array including a plurality of subdivisions (e.g., lanes) stores write data within the non-volatile memory array utilizing a plurality of block stripes of differing numbers of blocks, where all of the blocks within each block stripe are drawn from different ones of the plurality of subdivisions. The controller builds new block stripes for storing write data from blocks selected based on estimated remaining endurances of blocks in each of the plurality of subdivisions.

BRIEF DESCRIPTION OF THE SEVERAL VIEWS OF THE DRAWINGS

FIG. 7 illustrates an exemplary codeword stored in each data page in accordance with the present disclosure;

FIG. 8 depicts an exemplary codeword stored in each data protection page in accordance with the present disclosure;

DETAILED DESCRIPTION

Figure 1A:
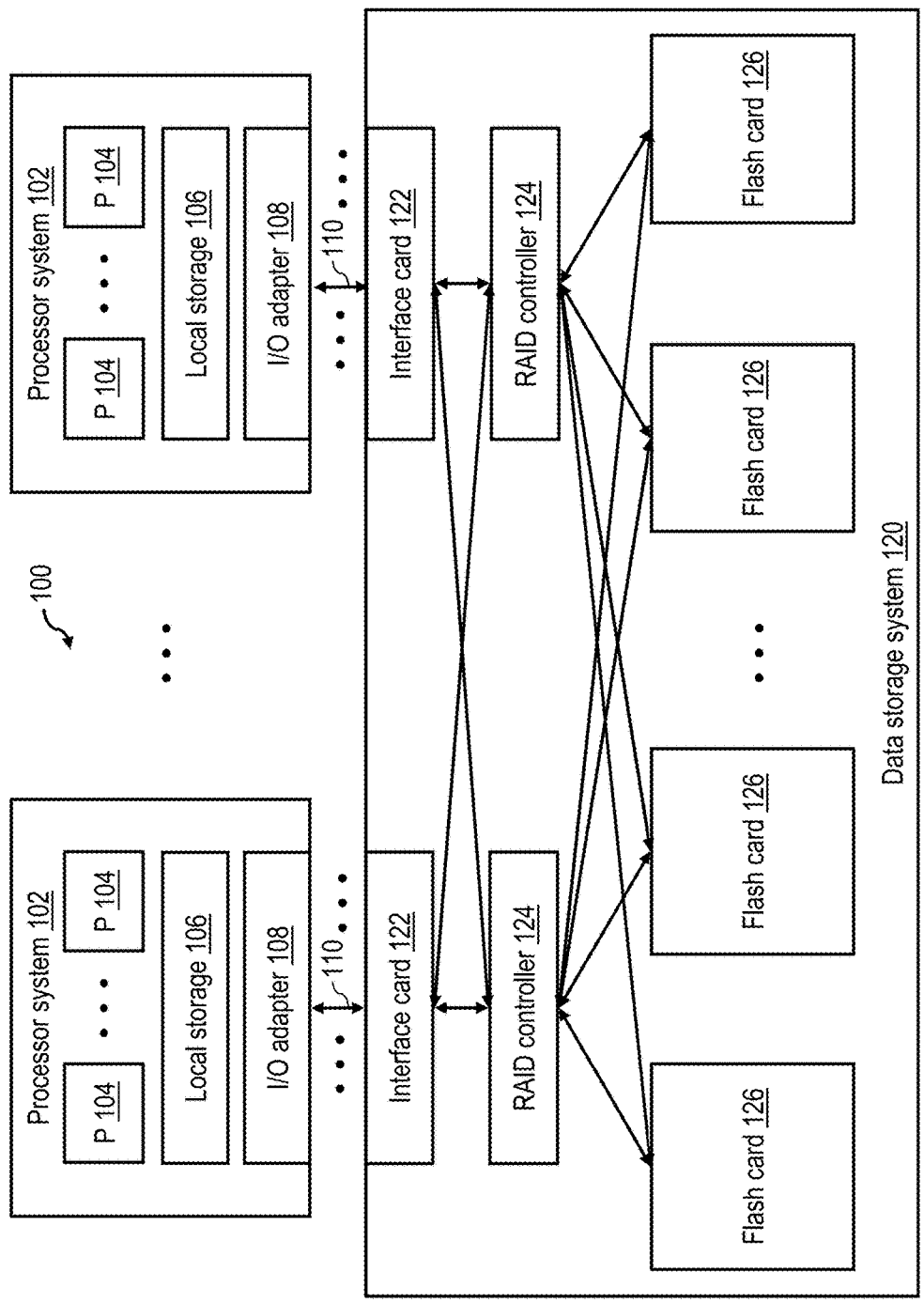
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, Power, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface cards 122 through which data storage system 120 receives and responds to input/output operations (IOP) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
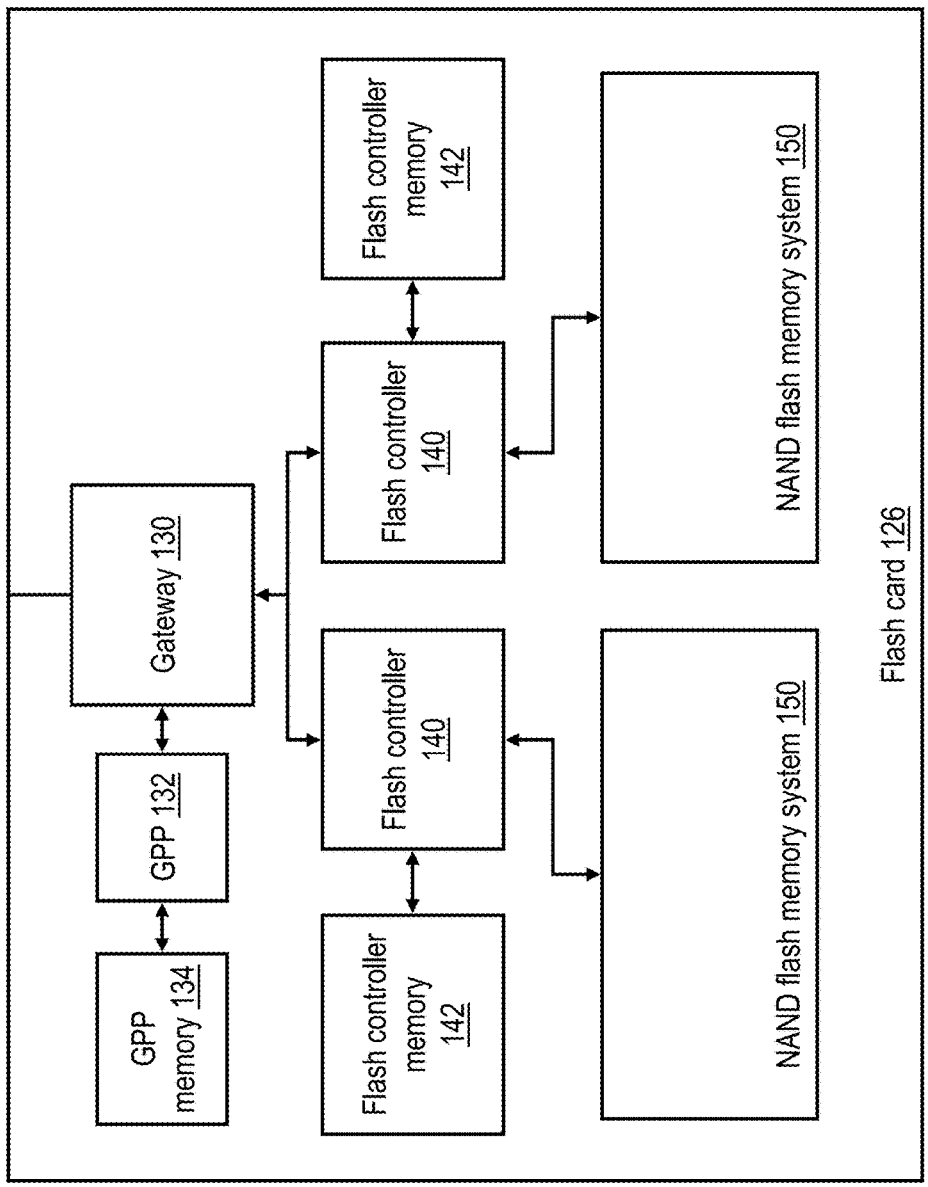
FIG. 1B is a more detailed block diagram of a flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing a memory cache (not illustrated) associated with NAND flash memory systems 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the page typically having a size of 4 kilobytes. Therefore, more than one logical page may be stored in a physical flash page. The flash translation layer translates this LBA into a physical address assigned to a corresponding physical location in a NAND flash memory system 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
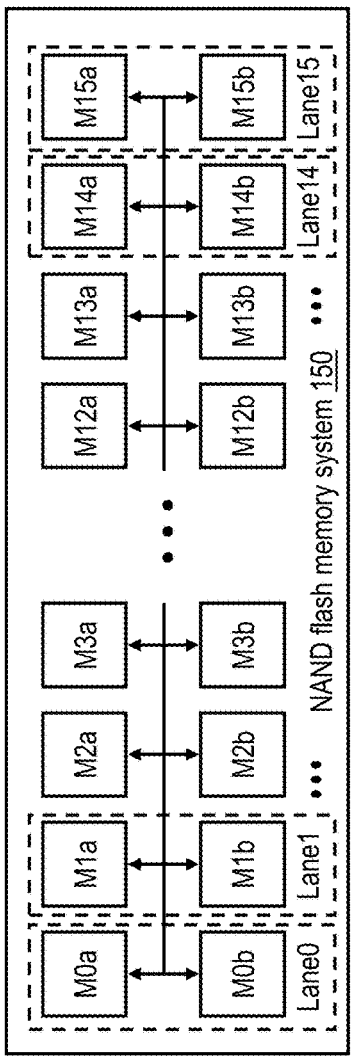
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module, for example, a Single Level Cell (SLC), Multi-Level Cell (MLC), Three Level Cell (TLC), or Quad Level Cell (QLC) NAND flash memory module. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
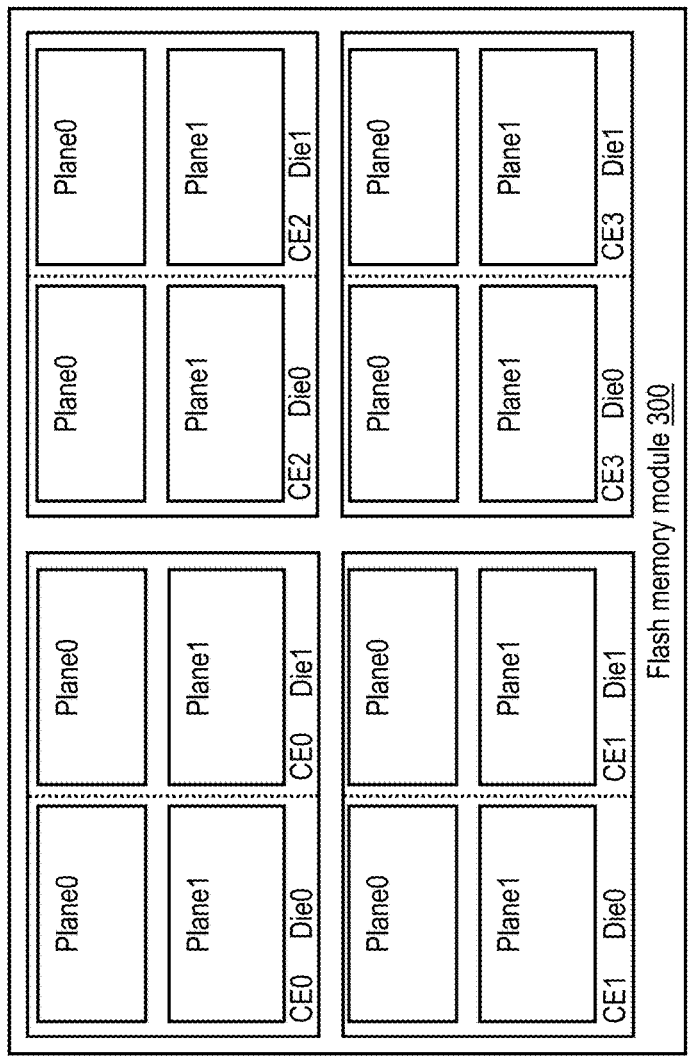

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
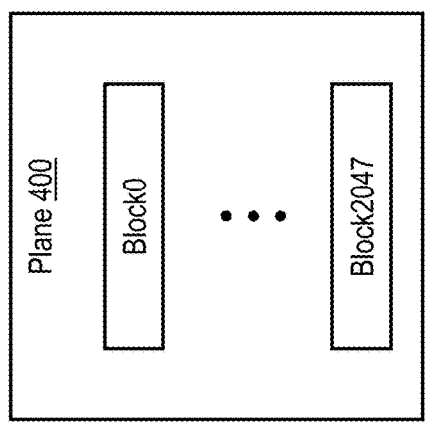
Figure 5:
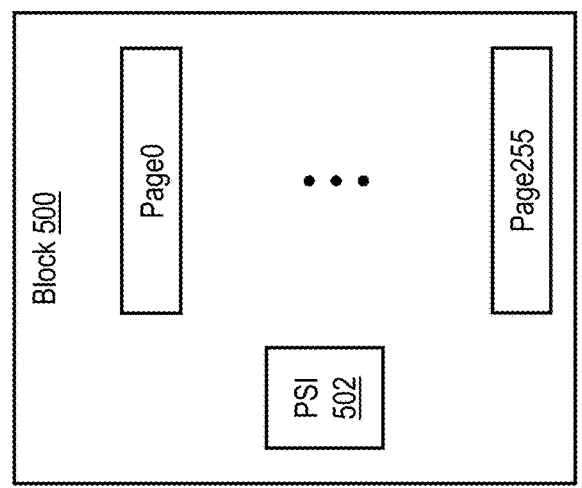

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block 500 is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis. As further shown in FIG. 5, each block 500 preferably includes page status information 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in a flash controller memory 142 and/or GPP memory 134).

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figure 6A:
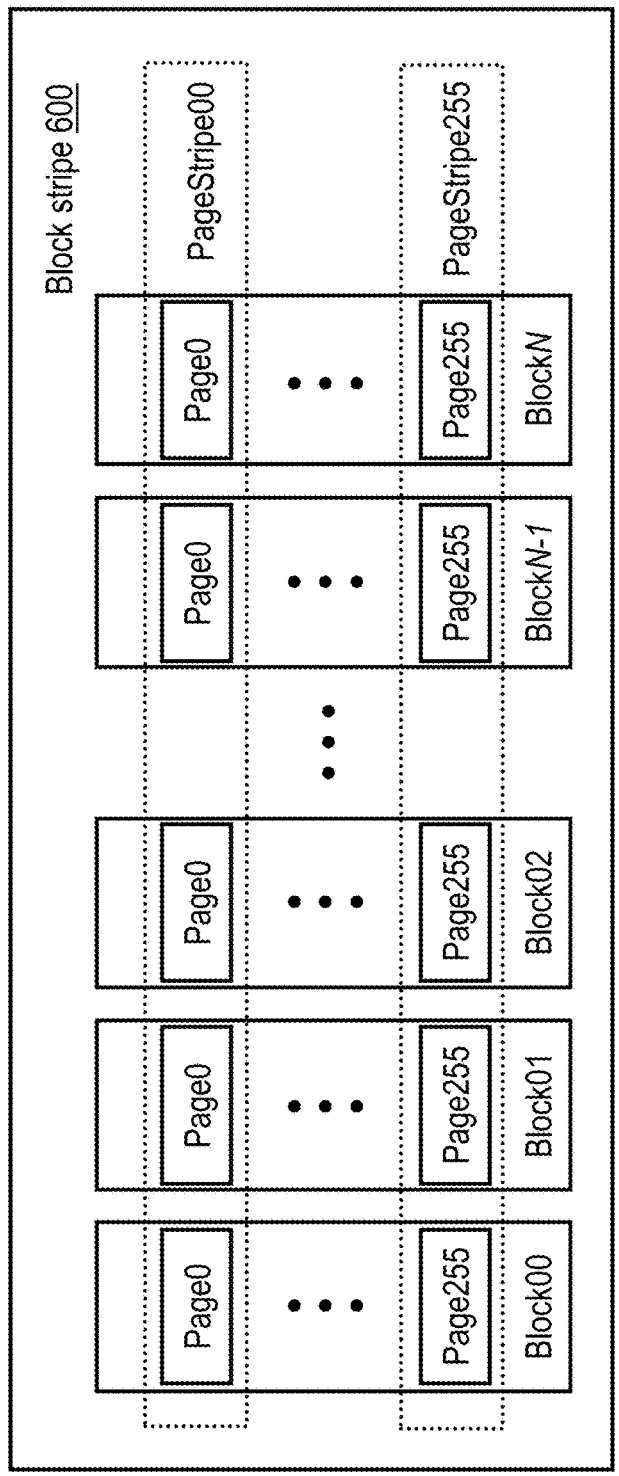
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
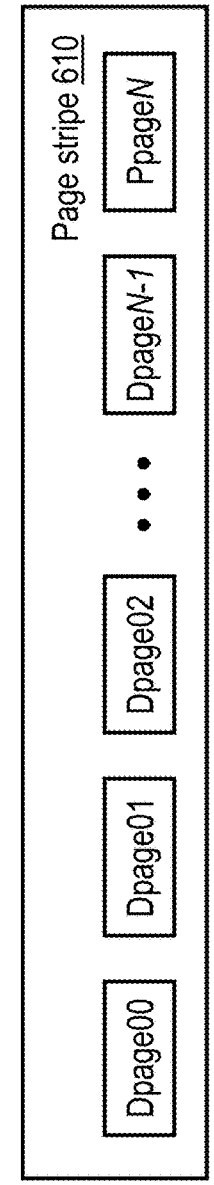
FIG. 6B depicts an exemplary implementation of a page stripe in accordance with the present disclosure.

Once a block from each lane has been selected and a block stripe is formed, page stripes are preferably formed from pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe, but typically is on the same lane for all page stripes of the same block stripe to minimize meta-data information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data page allows the correction of some number of bit errors within the flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data page and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Figure 10:
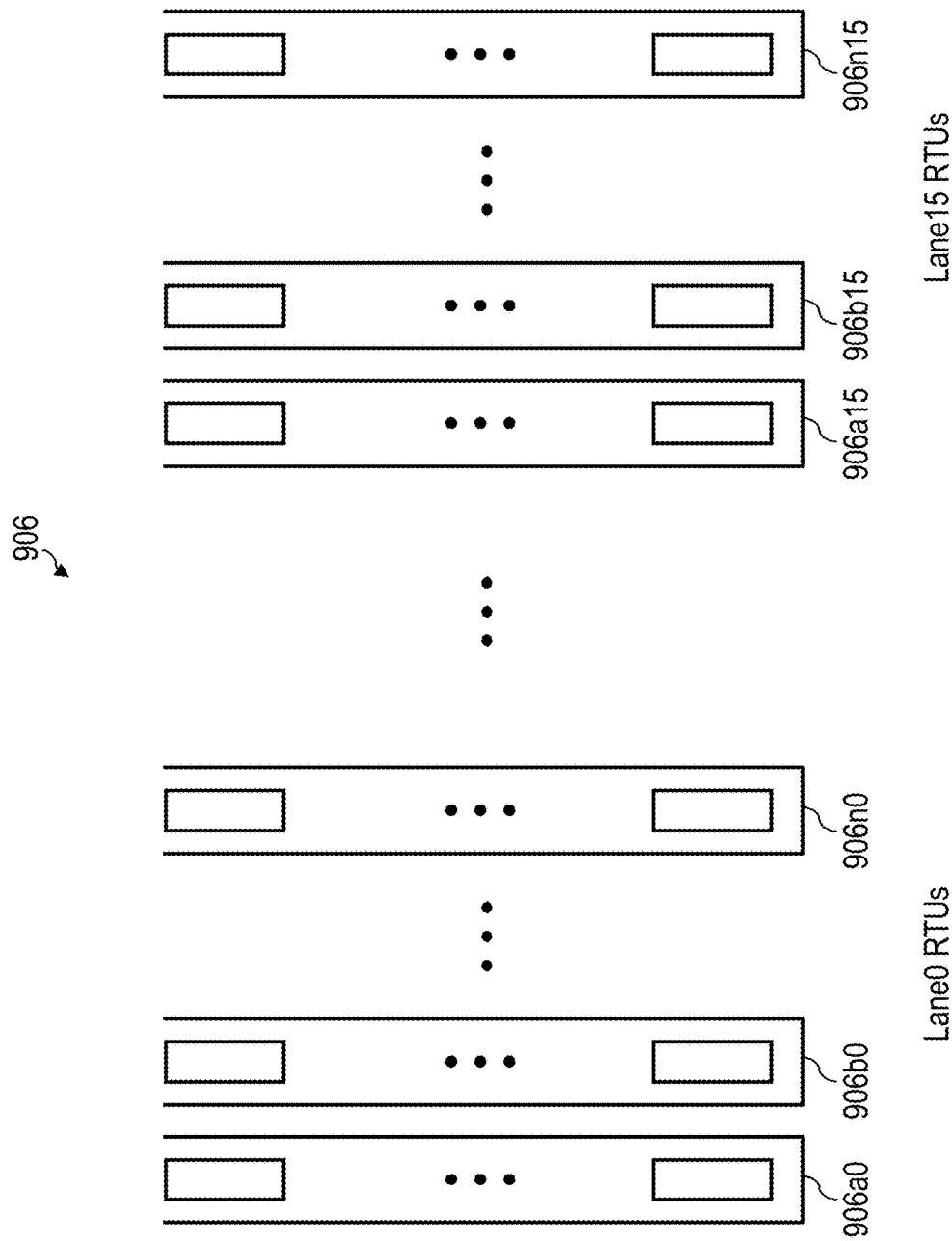
FIG. 10 depicts an exemplary implementation of ready-to-use queues in accordance with one embodiment of the present disclosure.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of the RTU queues 906 corresponding to its channel. For example, FIG. 10 illustrates an embodiment in which RTU queues 906 include RTU queues 906aX-906nX per lane (where X is an integer designating the lane number, so that those associated with Lane0 are identified as RTU queues 906a0-906n0 and those associated with Lane15 are identified as RTU queues 906a15-906n15). The corresponding RTU queues 906a, 906b, . . . , 906n across the lanes are preferably associated with a respective one of a plurality of block health grades (as described further below). In various implementations, between 2 and 8 RTU queues 906 per lane (and a corresponding number of block health grades) have been found to be sufficient.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data, as described, for example, in U.S. patent application Ser. No. 14/139,925, which is incorporated herein by reference in its entirety. Data placement function 910 then writes the write data, associated metadata (e.g., CRC and ECC values), and parity information for the page stripe in the allocated page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 updates LPT table 900 to remove the current association between the logical and physical addresses of the data. In addition, relocation function 914 issues relocation write requests to data placement function 910 to request that the data of the old block stripe be written to a new block stripe in NAND flash memory system 150. Once all still valid data has been moved from the old block stripe, the old block stripe is passed to dissolve block stripes function 916, which decomposes the old block stripe into its constituent blocks, thus disassociating the blocks. Each of the blocks formerly forming the dissolved block stripe is then erased. Based on the health metrics of each erased block, each erased block is either retired (i.e., withdrawn from use) by a block retirement function 918 among the flash management functions executed on GPP 132, or alternatively, prepared for reuse by placing the block on the appropriate ready-to-use (RTU) queue 906 in the associated GPP memory 134.

Figure 9:
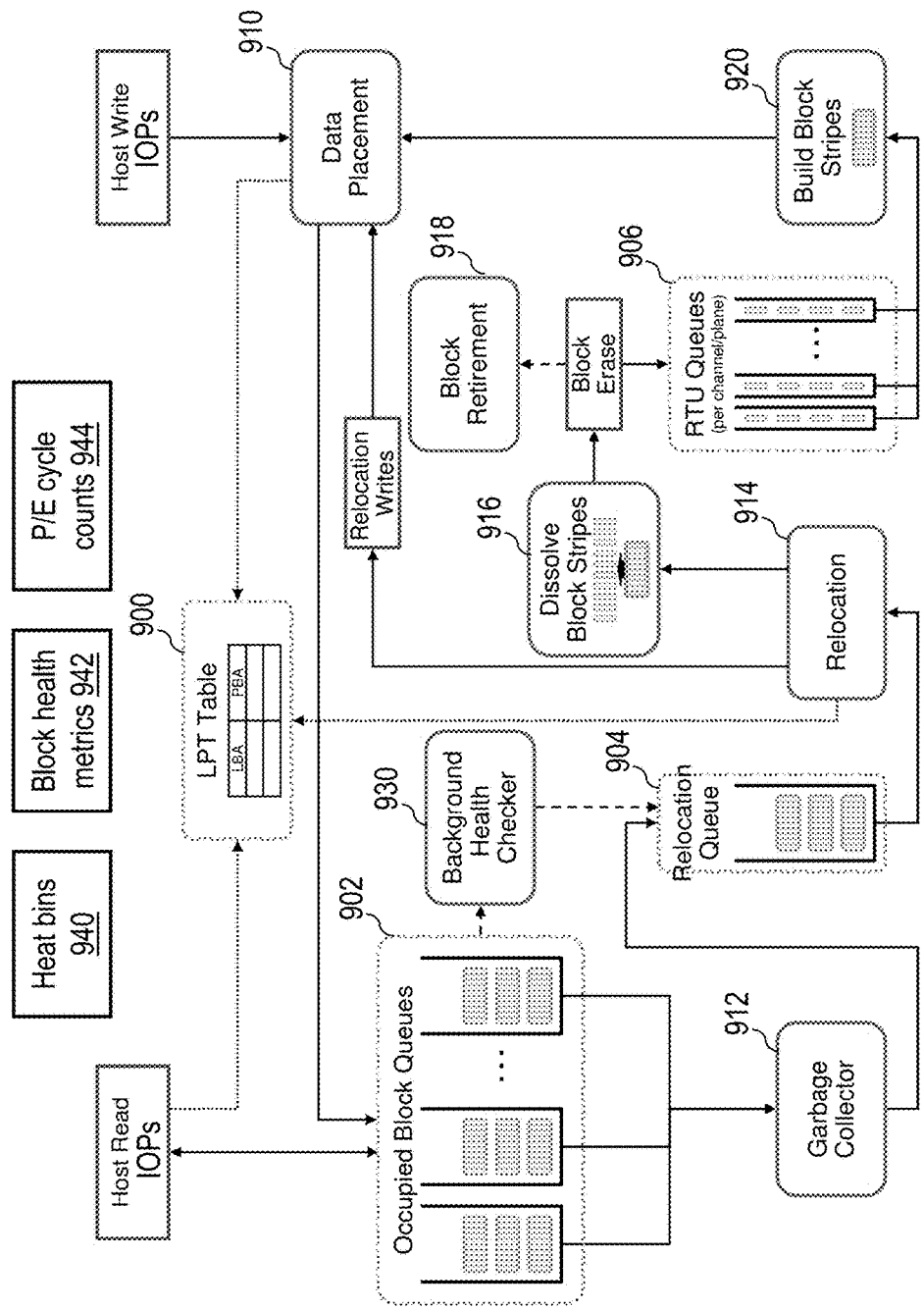
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of the block health metrics 942, background health checker 930 may place block stripes on relocation queue 904 for handling by relocation function 914.

Figure 11:
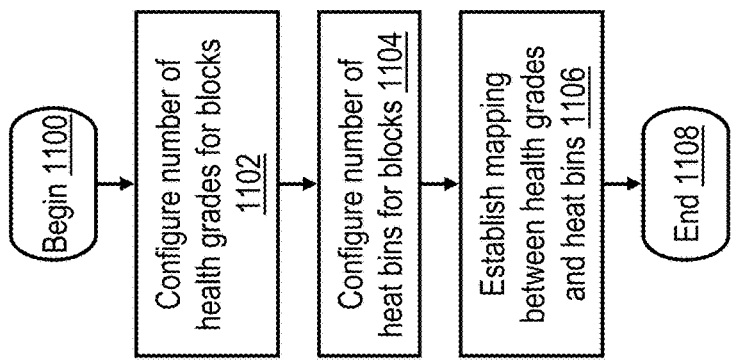
FIG. 11 is a high level logical flowchart of an exemplary process by which heat bins and block health grades are configured in accordance with one embodiment.

With reference now to FIG. 11, there is illustrated a high level logical flowchart of an exemplary process by which block health grades and heat bins are configured in accordance with one embodiment. The method may be performed, for example, by GPP 132 or flash controller 140 in hardware, firmware, software or a combination thereof at startup of data storage system 120. For simplicity of explanation, it will hereafter be assumed that the process is performed by flash controller 140. As with the other logical flowcharts presented herein, operations are presented in logical rather than strictly chronological order, and in some embodiments, operations can be performed in a different order than presented or concurrently.

The configuration process of FIG. 11 begins at block 1100 and then proceeds to block 1102, which illustrates flash controller 140 configuring a desired number of health grades for blocks of physical memory in NAND flash memory array 150. In various embodiments, the number of health grades can vary, but experimentally a number of health grades between two and eight inclusive has been found to be effective. For example, in one embodiment, flash controller 140 configures four health grades at block 1102. As noted above, the health grades employed herein are specifically defined to be based on one or more criteria other than the number of program/erase cycles, for example, one or more bit error rate (BER) metrics for each block (and/or the physical pages within each block) of physical memory.

At block 1104, flash controller 124 additionally configures a desired number of heat bins 940 for LBAs served by NAND flash memory array 140. In various embodiments, the number of heat bins 940 can vary, but experimentally a number of heat bins between two and eight inclusive has been found to be effective. For example, in one embodiment, flash controller 140 configures four heat bins 940 at block 1104, including a first heat bin for the least frequently written LBAs, a second heat bin for less frequently written LBAs, a third heat bin for more frequently written LBAs, and a fourth heat bin for the most frequently written LBAs. The number of heat bins 940 configured at block 1104 may, but need not, equal the number of health grades configured at block 1102.

At block 1106, flash controller 140 establishes a mapping between the heat bins 940 configured at block 1104 and the health grades configured at block 1102. In one particularly preferred embodiment, heat and health are directly correlated, with the hottest LBAs mapped to the healthiest grades and the coldest LBAs mapped to a less healthy grade. Of course, in other embodiments, other mappings between access heat and health grades may be employed. For example, in one embodiment in which numeric heat and health grades are employed, the mapping established at block 1106 is determined by a mathematical function selected to yield an approximately constant result from health grades and access heats that are mapped to one another (e.g., C≈f (heat, health)). In another embodiment, the mapping from heat to health grade maps every heat bin to a sorted priority list of health grades. At the time block stripes are built from blocks in the RTU queues 906, there might not be a block in the preferred RTU queue 906 with a given health grade. The sorted priority list then allows assignment of a block from another RTU queue 906 for the same lane that has a health grade as close as possible to the preferred one. Following block 1106, the configuration process given in FIG. 11 ends at block 1108.

Figure 12A:
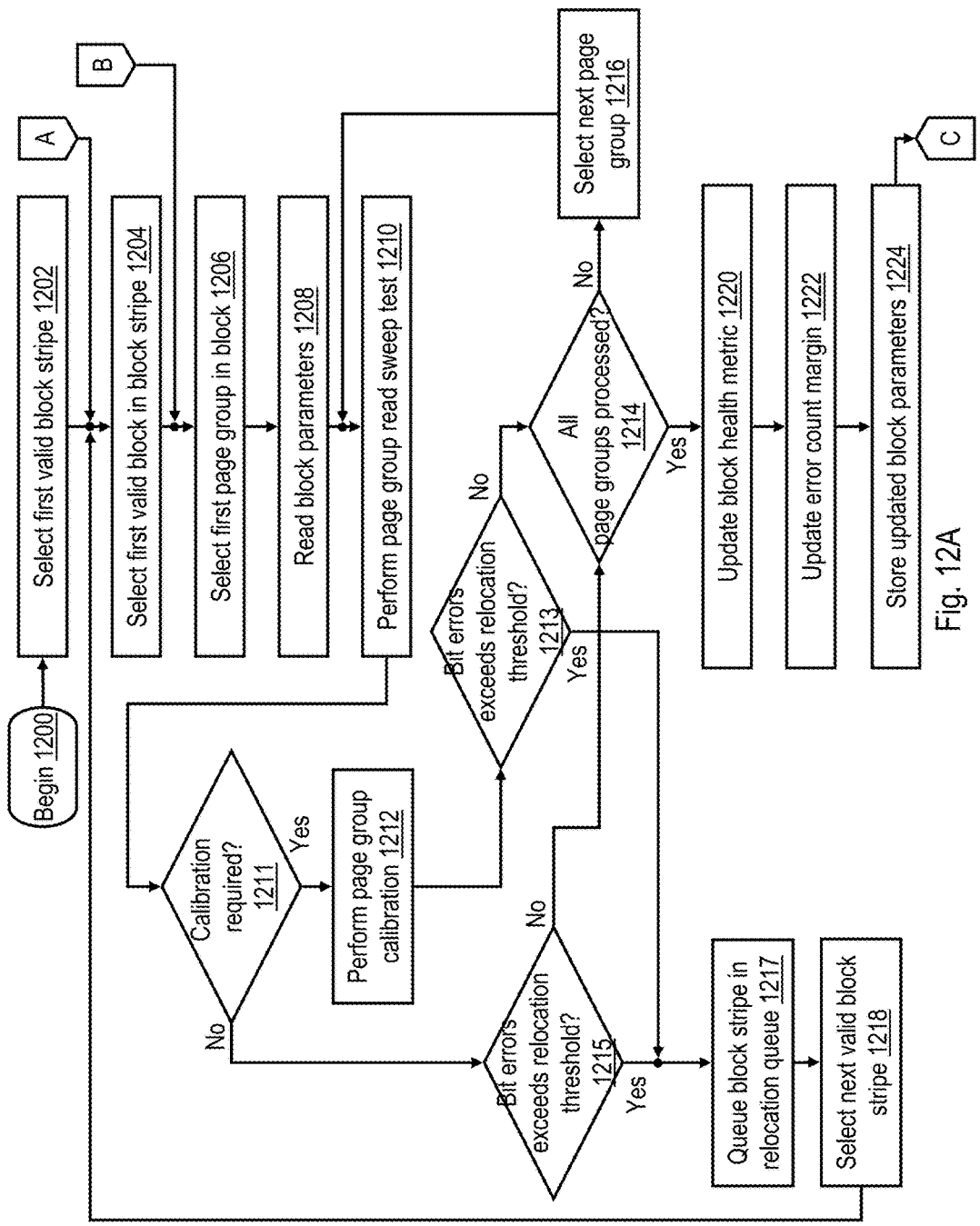
FIGS. 12A-12B together form a high level logical flowchart of an exemplary process of background flash management in accordance with one embodiment.
Figure 12B:
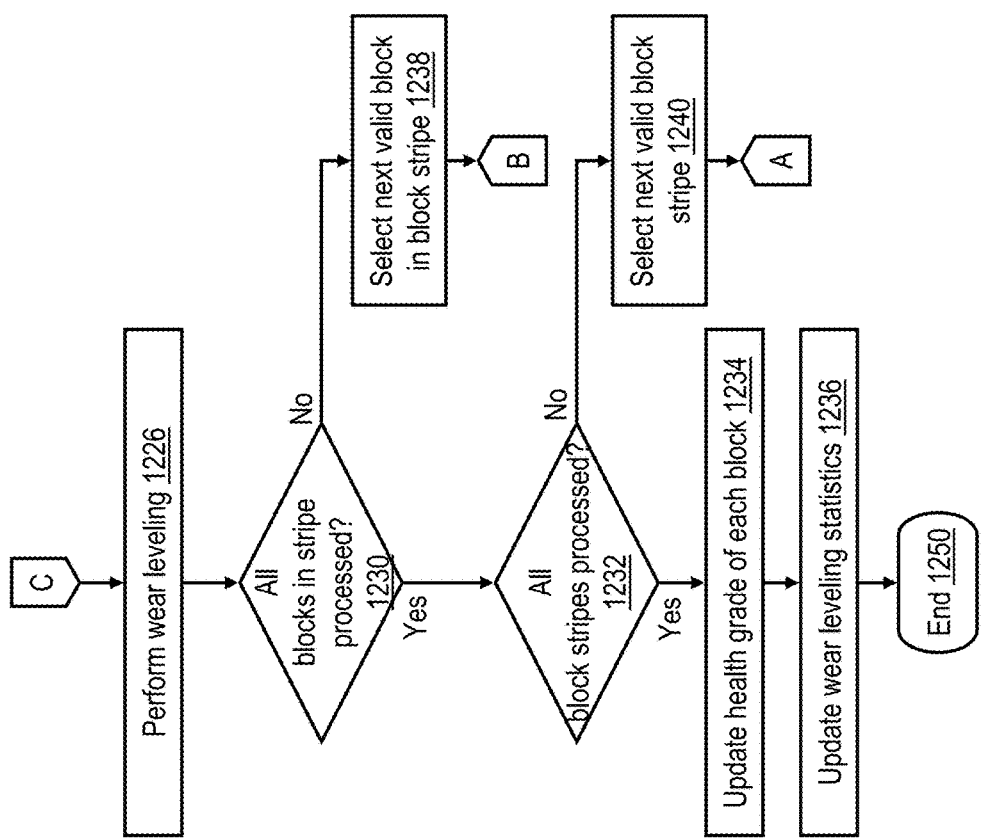

Referring now to FIGS. 12A-12B, there is depicted a high level logical flowchart of an exemplary process by which background flash management is performed in accordance with one embodiment. The illustrated process may be performed, for example, by background health checker 930 of flash controller 140 and/or GPP 132 in hardware, firmware, software or a combination thereof. For simplicity of explanation, it will hereafter be assumed that the process is performed by background health checker 930 executing on GPP 132. The described process merges into one process multiple different flash management functions in order to achieve enhanced data and processing efficiency.

The background flash management process begins at block 1200 and then proceeds to block 1202, which depicts background health checker 930 selecting a first valid block stripe from occupied block queues 902. Background health checker 930 then selects a first valid block in the selected block stripe (block 1204) and a first page group in the selected block (block 1206). In at least one embodiment, the page group selected at block 1206 is a possibly non-contiguous group of pages within the same memory block. Hence, traversal of page stripes may not be in contiguous ascending sequence as is done in prior art. For example, in the embodiment of FIG. 6A in which each block comprises 256 pages, a page group may include approximately sixteen valid pages of the block. In some embodiments, the page group can be formed arbitrarily, for example, by taking the valid pages from a set formed of each sixteenth page of the block. More preferably, each page group is formed of valid pages in the block that have similar health and/or similar read threshold voltage shift values (as described below).

It should be noted that in the disclosed embodiment, background health checker 930 periodically loops over all valid block stripes, but does not process erased blocks within RTU queues 906. In an alternate embodiment, background health checker 930 can be configured to alternatively iterate over all blocks (i.e., both valid blocks and erased blocks) rather than only valid block stripes. In this embodiment, however, counters and other metadata must be maintained per-block, thus increasing the amount of metadata that must be kept to perform health checking. In addition, those skilled in the art will appreciate that some of the functions of the background health checker 930 might not be executed on erased blocks.

It should also be noted that the illustrated embodiment of the process iterates through each block page-group-by-page-group before processing continues with the next block. This structure differs from many prior art systems in which background health checking is performed across multiple blocks before processing of any one block is completed. In doing so, background health checking of an entire or partial block can be supported by dedicated hardware, which can report per-page bit error counts, per-page-group bit error counts and/or a maximum per-page bit error count for the block. At the same time, processing one entire block at a time minimizes the statistical information that must be maintained during any given iteration of background health checker 930.

At block 1208, background health checker 930 reads health-related parameters of the block, which may be stored, for example, in PSI 502, flash controller memory 142, and/or GPP memory 134. The health-related parameters can include, for example, read threshold voltage shift values that specify the voltage shift(s) from the nominal voltage thresholds utilized to represent different data values in the cells of a page group. In addition, the health-related parameters can include the error count margin, which is a configurable threshold that can be expressed as a fixed percentage of bit errors in excess of the current maximum per-page-group bit error count found with the block. As will be appreciated, the health-related parameters may include further parameters, such as a read disturb count value indicating a number of read disturbs either per-page group and/or a maximum per-page-group read disturb count value over the block or program/erase cycles since the block has been last calibrated.

At block 1210, background health checker 930 performs a page group read sweep test over the selected page group. For example, in one exemplary embodiment, flash controller 140 reads all physical pages in the page group with the current read threshold voltage shift values accessed at block 1208 and determines and records the number of bit errors per codeword, per-page and over the page group. In the normal case, all pages of the page group are successfully read. Exceptionally, one or more pages can no longer be read (i.e., contain too many errors such that one or more codewords are uncorrectable). In this case, background health checker 930 terminates the background health checking process for the current block stripe and queues the block stripe for relocation by placing an identifier of the block stripe in relocation queue 904. Note that the individual page read operations can be scheduled in predetermined time intervals (not shown) such that the background health checker 930 does not impact host IOPs and in the end the entire NAND flash memory system 150 can be traversed in a predefined time interval (e.g., 1 week).

At block 1211, background health checker 930 additionally determines if any block in the block stripe requires calibration and/or the end of calibration interval has been reached for the currently selected page group or block, for example, by determining whether a calibration time interval (e.g., one week) has elapsed and/or a number of bit errors detected in the page group (or a page in the page group) during the read sweep performed at block 1210 has exceeded a first calibration threshold and/or increased by more than a second calibration threshold and/or the block had been marked explicitly for calibration. In response to a determination at block 1211 that calibration is not required, the process passes to block 1215, which depicts background health checker 930 determining whether the bit errors for the page group exceeds a relocation threshold. In response to the relocation threshold being exceeded, background health checker 930 places the block stripe on relocation queue 904 (block 1217) and may downgrade the health grade of the block, as recorded in block health metrics 942. Background health checker 930 further selects the next valid block stripe in block 1218 and continues its processing at block 1204 as described above. If, however, background health checker 930 determines at block 1211 that calibration is required, the process passes to a page group calibration step at block 1212. It should be noted that in some embodiments of the disclosed process, the read sweep test depicted at block 1210 and the page group calibration step illustrated at block 1212 are performed at the same intervals; in other embodiments, page group calibration can be performed at a longer interval than the read sweep test.

As noted above, block 1212 illustrates background health checker 930 performing a page group calibration in which background health checker 930 determines a preferred read threshold voltage shift value for the current page group. For example, in one embodiment, background health checker 930 performs the page group calibration by instructing the flash controller 140 to read data from one or more pages of the page group using at least one read voltage threshold shift value that is higher than the current read voltage threshold shift value and at least one read voltage threshold shift value that is lower than the current read voltage threshold. Background health checker 930 records (e.g., in GPP memory 134) the read threshold voltage shift value that produced the lowest number of errors during calibration as the preferred read threshold voltage shift value for the page group and marks the page group as calibrated in the block statistics. Similarly as in the read sweep test performed at block 1210, the individual page read operations for calibration can be scheduled in predetermined time intervals (not shown) such that background health checker 930 does not impact host IOPs and in the end the entire NAND flash memory system 150 can be traversed in a predefined time interval (e.g., 1 week).

In at least some embodiments, background health checker 930 supports multiple different levels of calibration, including:

Fast calibration: Reads only a limited number of sample pages in the page group utilizing multiple (e.g., 2-5) different read threshold voltage shift levels;

Normal calibration: Reads all pages in the page group utilizing multiple (e.g., 2-5) different read threshold voltage shift levels; and Extensive calibration: Reads all pages in the page group utilizing a large set of different read threshold voltage shift values (up to all possible values).

In the embodiments supporting multiple levels of calibration, background health checker 930 preferably reduces the system resources consumed by background health checking by generally performing fast calibration and then performing normal calibration at longer intervals, such as every four weeks. Further, background health checker 930 can determine the level of calibration to employ at block 1212 based on the results of the read sweep at block 1210 and/or based on bit errors detected while servicing host read IOPs and/or other health related meta-data maintained by the management code running on GPP 132, for example, by employing normal calibration if the number of bit errors detected exceeds a first calibration selection threshold, employing extensive calibration if the number of bit error detected exceeds a greater second calibration selection threshold, and otherwise employing fast calibration. In response to the calibration not resulting in update of the read threshold shift value and the bit errors for the page group exceeding a relocation threshold in block 1213, background health checker 930 can also place a block stripe on relocation queue 904 in block 1217 and downgrade the health grade of one or more blocks, as recorded in block health metrics 942. Background health checker 930 then selects the next valid block stripe in block 1218 and continues processing at block 1204. The selection of the next valid block stripe in block 1218 can take a predetermined time interval, such that the background health checker 930 does not impact host IOPs and in the end the entire NAND flash memory system 150 can be traversed in a predefined time interval (e.g., 1 week).

It should be noted that because the read sweep performed at block 1210 is also performed on a page group basis, there is no need to again perform reads over the page group using the current read voltage threshold shift value at block 1212. Thus, by performing read sweep testing and page group calibration in a unified (merged) process, additional efficiency is achieved.

In response to a determination at block 1213 that the bit errors for the page group do not exceed a relocation threshold, the process proceeds to block 1214. At block 1214, background health checker 930 determines whether or not all page groups within the currently selected block have been processed. If not, background health checker 930 selects a next page group for processing at block 1216, and the process returns to block 1210, which has been described. If, however, background health checker 930 determines at block 1214 that all page groups in the currently selected block have been processed, the process passes to block 1220, which illustrates background health checker 930 updating one or more block health metrics 942 for the block in GPP memory 134. The block health metric can be based on, for example, the maximum (i.e., worst) per-page bit error count found for any individual page in the block and/or one or more additional health-related factors. At block 1222, background health checker 930 computes and updates the error count margin for the block, which as noted above, can be implemented as an error count that is a given percentage above (e.g., 12% or 20%) the current maximum per-page bit error count for the block. In a preferred embodiment, the error count margin is capped below the block retirement error count limit, which would cause the block to be retired by block retirement function 918. In addition, at block 1224 background health checker 930 stores the updated block parameters for the block, for example, in flash controller memory 142 and/or PSI 502.

Following block 1224, the process proceeds through page connector C to block 1226 of FIG. 12B, which illustrates background health checker 930 performing wear leveling for this block stripe, if needed, to more evenly distribute the wear of program/erase cycles across blocks. In one exemplary embodiment, the wear leveling performed at block 1226 may queue block stripes to relocation queue 904 based on block health metrics 942, such as the worst page BER, the number of correctable errors in the worst block, and/or endurance metrics, such as the P/E cycle counts 944 of the constituent blocks. The execution of wear leveling can alternatively or additionally be done in a separate background process or at the end of performing health grade updates in block 1234 (described below), but is preferably executed at this point in the process as it reduces the system resources for flash management by generally performing wear leveling based on the results of the read sweep at block 1210 and/or based on the page group calibration at block 1212 such that no additional reads of block data need to be performed. Background health checker 930 then determines at block 1230 whether all blocks in the currently selected block stripe have been processed. If so, the process passes to block 1232, which is described below. If not, background health checker 930 selects the next valid block in the block stripe (block 1238), and then returns through page connector B to block 1206 of FIG. 12A, which has been described.

Block 1232 of FIG. 12B illustrates flash controller 140 determining whether or not all block stripes in NAND flash memory system 150 have been processed. If not, background health checker 930 selects the next valid block stripe (block 1240) and returns through page connector A to block 1204 of FIG. 12A, which has been described. Note that the selection of the next valid block stripe at block 1240 can take a predetermined time interval, such that background health checker 930 does not impact host IOPs and in the end the entire NAND flash memory system 150 can be traversed in a predefined time interval (e.g., 1 week). In response to determining at block 1232 that all block stripes have been processed, the process of FIG. 12B proceeds to block 1234.

Block 1234 illustrates background health checker 930 updating the health grade of each block, as recorded, for example, in block health metrics 942. In addition, at block 1236, background health checker 930 updates wear leveling statistics, for example, by determining the number of wear leveling moves that can be issued for different characteristics. Here again, the background health checker 930 preferably reduces the system resources consumed by background health checking by generally performing health grading based on the results of the read sweep at block 1210, and/or based on the page group calibration at block 1212 such that no additional reads of block data need to be performed, and based on the block health metric update at block 1220. Thereafter, the process of FIGS. 12A-12B ends at block 1250 until a next scheduled iteration of background health checker 930.

The present disclosure appreciates that in some cases prior art wear leveling techniques implemented during background health checks can react too slowly to the degrading health of block stripes to rebalance wear and significantly improve endurance of a NAND flash memory system 150. In other cases, prior art wear leveling techniques may be too aggressive in relocating block stripes and actually cause additional unnecessary wear through write amplification. The present disclosure accordingly implements a technique of wear leveling that may be used as an alternative to or in addition to the previously described wear leveling performed at block 1226 of FIG. 12B by background health checker 930. In one or more preferred embodiments, the wear leveling technique is performed during the formation of block stripes by build block stripes function 920. In at least some embodiments, build block stripes function 920 performs wear leveling based on estimates of the remaining endurance of the blocks ready-to-use in each lane.

Figure 13:
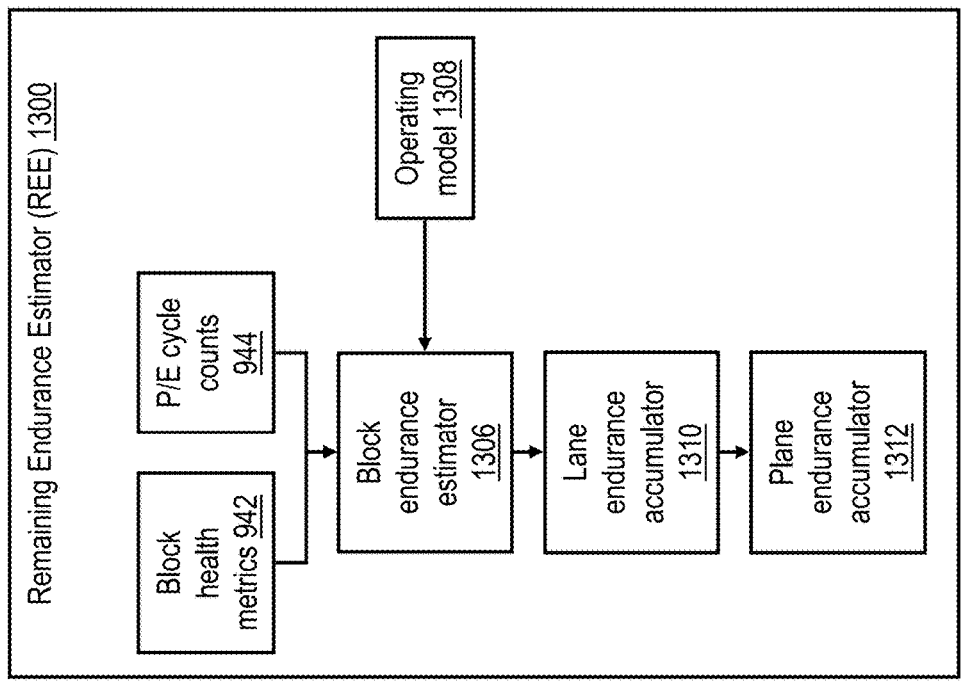
FIG. 13 illustrates a remaining endurance estimator implemented within a block stripes function in accordance with one embodiment.

With reference now to FIG. 13, there is illustrated a high level block diagram of a remaining endurance estimator (REE) 1300 that may be implemented within build block stripes function 920 in accordance with one embodiment. REE 1300 may be implemented, for example, by GPP 132 or flash controller 140 in hardware, firmware, software or a combination thereof.

REE 1300 receives as inputs block health metrics 942 and per-block P/E cycle counts 944. For each block in the system, a block endurance estimator 1306 matches the block's current block health and P/E cycle count with an endurance curve obtained from an operating model 1308 of a flash memory module 300, which can be predetermined (by the flash memory manufacturer or upfront characterization data) or built dynamically from characterization data observed during operation of the flash memory module.

Figure 14:
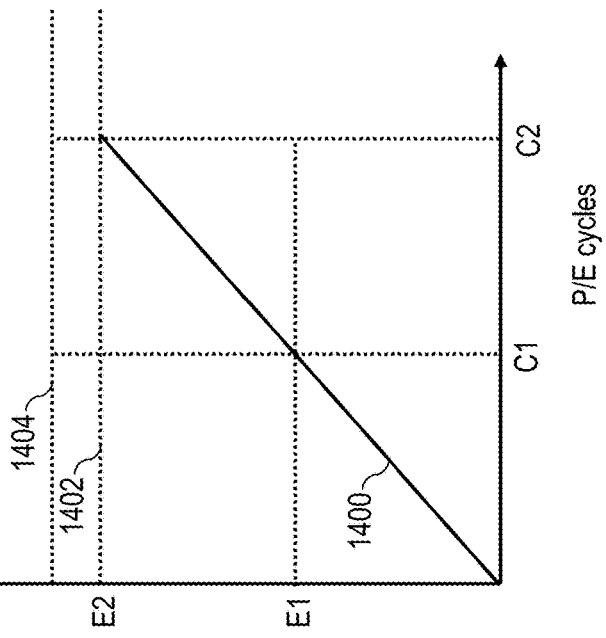
FIG. 14 is a graph depicting an endurance curve providing an estimated endurance of a block of NAND flash memory in accordance with one embodiment.

FIG. 14 is a graph depicting an exemplary endurance curve 1400 providing an estimated endurance of a block of NAND flash memory in accordance with one embodiment. In this example, endurance curve 1400 relates a selected one of block health metrics 942 (e.g., worst-page BER of the block) with the block's estimated endurance (i.e., useful lifetime) as expressed in P/E cycle counts. In this particular embodiment, the useful lifetime of a block is estimated to terminate at P/E cycle C2 when the worst-page BER reaches a BER threshold 1402 (corresponding to a BER of E2). As further shown in FIG. 14, in preferred embodiments, BER threshold 1402 is preferably selected to be less than an ECC correction threshold 1404 at which the error correction mechanisms of the flash memory module 300 can no longer accurately correct transient bit errors in the block, for example, a BER corresponding to at least a threshold data retention time. As the relationship between P/E cycles and BER is derived from the operation model 1308 it does not have to be linear as is shown in FIG. 14; however, the BER typically strictly increases with increasing P/E cycles.

In a typical embodiment, operating model 1308 will provide block endurance estimator 1306 a family of multiple endurance curves characterizing various combinations of a selected block health metric and P/E cycle counts. Block endurance estimator 1306 projects an endurance of a block by matching its current block health metric and current P/E cycle count to one of the endurance curves and then estimating the endurance of the block as the P/E cycle count at which the endurance curve reaches BER threshold 1402. Again taking endurance curve 1400 of FIG. 14 as exemplary, block endurance estimator 1306 may select endurance curve 1400 from among the family of endurance curves based on a block having a BER of E1 at a P/E cycle count of C1 and then, using endurance curve 1400, determines the estimated endurance of the block as C2 P/E cycles and determines the estimated remaining endurance of the block as C2-C1 P/E cycles.

Returning to FIG. 13, REE 1300 further includes a lane endurance accumulator 1310. In at least one embodiment, lane endurance accumulator 1310 sums the estimated remaining endurance of the blocks identified in each of RTU queues 906 and/or the blocks in the occupied block queues 902 and/or the blocks in the relocation queues 904 so that the total estimated remaining endurance of the selected set of blocks in each lane are determined. In a preferred embodiment all blocks in the system are included in the set of selected blocks. In some embodiments however, the required block health metrics 942 may not be available for all blocks due to meta-data size limitations. As described further below with reference to FIG. 15, these aggregate estimated remaining endurances can then be used to balance wear during the formation of block stripes. Similarly, an alternative embodiment may also include an optional plane endurance accumulator 1312 that sums the estimated remaining endurance of the selected set of blocks in each plane. These per-plane aggregate estimated remaining endurances can then be used in data placement 910 to select a particular plane from which the build block stripe function 920 should assemble a block stripe.

Figure 15:
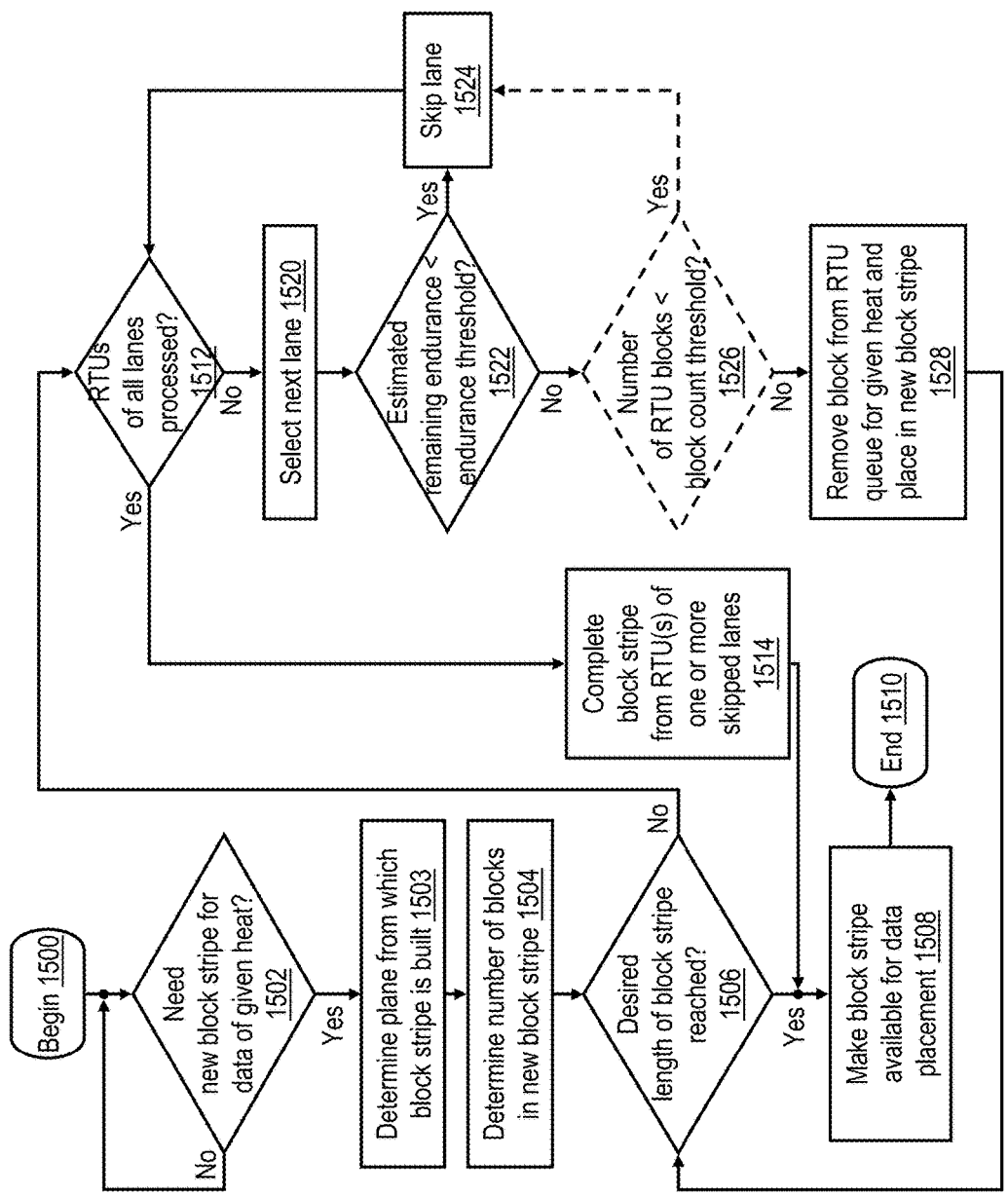
FIG. 15 is a high level logical flowchart of an exemplary process of wear leveling during block stripe formation based on estimated block endurance in accordance with one embodiment.

With reference now to FIG. 15, there is illustrated a high level logical flowchart of an exemplary process of wear leveling during block stripe formation based on estimated block endurance in accordance with one embodiment. The illustrated process may be implemented, for example, by the build block stripes function 920 and/or data placement function 910 performed by GPP 132 or flash controller 140 in hardware, firmware, software or a combination thereof.

The process of FIG. 15 begins at block 1500 and then proceeds to block 1502, which illustrates build block stripes function 920 determining whether or not a new block stripe is needed for a given heat of data. In at least some embodiments, build block stripes function 920 determines whether a new block stripe is needed based on demand for new block stripes generated by write IOPs and/or the number of currently available unused block stripes for each heat bin 940. In response to a determination at block 1502 that there is presently no need to build a new block stripe for a given heat, the process iterates at block 1502. However, in response to build block stripes function 920 determining that a new block stripe is needed for holding write data of a particular heat, the process passes to block 1503. At block 1503 the process decides from which plane the build block stripe function 920 will assemble a block stripe. This may be done as in prior art in a round robin fashion among all planes. In a preferred embodiment, the plane is determined using the per-plane aggregate estimated remaining endurances determined by the plane endurance accumulator 1312 in REE 1300, which allows an entire plane to be skipped from the round robin allocation when its estimated remaining endurance is below a first endurance threshold. The first endurance threshold may be dynamic, for example, implemented a function of the aggregate estimated remaining endurances of all planes determined by REE 1300 such that wear can be rebalanced within reasonable amount of writes without noticeable performance impact on host IOPs. In this context, the number of planes that can be skipped in a single round robin iteration may be limited in a particular embodiment. The process then passes to block 1504.

At block 1504, build block stripes function 920 preferably determines a desired number of blocks within a new block stripe to be built. For example, in some embodiments, build block stripes function 920 is configured to build and queue for use block stripes of a variety of differing lengths in order to efficiently store page stripes of varying lengths. At block 1506, build block stripes function 920 enters a processing loop in which build block stripes function 920 determines whether enough blocks have been assigned to the block stripe under construction to reach the desired length determined at block 1504. If so, the process passes to block 1508, which is described below. If not, the process proceeds to block 1512, which illustrates build block stripes function 920 determining whether or not the RTU queues 906 of all lanes of NAND flash memory system 150 have been processed. If so, the process passes to block 1514, which is described below. If, however, build block stripes function 920 determines at block 1512 that the RTU queues 906 of all lanes have not been processed, the process proceeds to block 1520.

Block 1520 depicts build block stripes function 920 selecting a next lane for which RTU queues 906 are to be processed. In various embodiments, various selection techniques, such as round robin, random, least recently used, etc. can be utilized to select the next lane. Next, at block 1522, build block stripes function 920 determines at block 1522 whether or not the estimated remaining endurance for the selected lane and given heat, as determined by lane endurance accumulator 1310 of REE 1300, satisfies a second endurance threshold (e.g., in one embodiment, is less than the second endurance threshold). It should be noted that in at least some embodiments the endurance threshold of each heat is independently configurable and can be reduced by GPP 132 and/or flash controller 140 over the operating lifetime of NAND flash memory system 150, for example, based on the declining average estimated endurance of blocks associated with a given heat across all lanes. Further, the second endurance threshold may be dynamic, for example, implemented a function of the aggregate estimated remaining endurances of all lanes determined by REE 1300 such that wear can be rebalanced within reasonable amount of writes without noticeable performance impact on the host IOPs. In response to a determination at block 1522 that the estimated remaining endurance for the selected lane and given heat satisfies the endurance threshold, build block stripes function 920 skips the lane when forming the new block stripe (block 1524), meaning that the RTU queue 906 for the given heat and the selected lane does not contribute a block to the new block stripe. It should be noted, however, that while the blocks in the RTU queue 906 are temporarily excluded for use in forming a block stripe of the given heat, build block stripes function 920 may still employ the blocks in the RTU queue 906 for constructing block stripes intended for colder data. In addition, in a particular embodiment the number of lanes that can be skipped for building a block stripe might be limited. Following block 1524, the process then returns to block 1512, which has been described.

Referring again to block 1522, in response to determining that the estimated remaining endurance for the selected lane and given heat does not satisfy the endurance threshold, the process passes to optional decision block 1526, which illustrates build block stripes function 920 making a further determination of whether or not the aggregate number of blocks identified within the RTU queue 906 for the given heat and selected lane satisfies (e.g., is less than) a block count threshold. In response to an affirmative determination at block 1526, the process passes to block 1524, which has been described. If, however, a negative determination is made at block 1526 or if block 1526 is omitted, the process passes to block 1528. Block 1528 illustrates build block stripes function 920 dequeuing a block from the RTU queue 906 for the given heat and selected lane and placing the block within the new block stripe. The process then returns to block 1506.

As the process iterates through the loop illustrated at block 1506, blocks are added to the block stripe until the desired block stripe length is reached (block 1506) or the RTU queues 906 of all lanes are processed (block 1512). In response to a determination at block 1512 that the RTU queues 906 of all lanes have been processed without reaching the desired length of the block stripe, build block stripes function 920 completes the block stripe using blocks from the RTU queues 906 of one or more lanes that were initially skipped. As one example, build block stripes function 920 may include, from a previously skipped lane, a block from an RTU queue 906 associated with a higher heat than the given heat. Following block 1514 or in response to a determination at block 1506 that the desired length of the block stripe has been reached, build block stripes function 920 makes the new block stripe available for data placement, as shown at block 1508, for example, by adding the new block stripe to an unillustrated queue. Thereafter, the process of FIG. 15 ends at block 1510.

While the method of FIG. 15 has been specifically described with reference to an embodiment in which blocks are queued for re-use (and skipped during block stripe formation) on a lane-by-lane basis, it should be appreciated that in other embodiments, blocks can alternatively be queued for re-use (and skipped during block stripe formation) at an alternative subdivision of storage granularity, such as module, CE, die or plane, or at a combination of two or more different subdivisions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a controller of a non-volatile memory array including a plurality of subdivisions stores write data within the non-volatile memory array utilizing a plurality of block stripes of differing numbers of blocks, where all of the blocks within each block stripe are drawn from different ones of the plurality of subdivisions. The controller builds new block stripes for storing write data from blocks selected based on estimated remaining endurances of blocks in each of the plurality of subdivisions.

While the present invention has been particularly shown as described with reference to one or more preferred embodiments, it will be understood by those skilled in the art that various changes in form and detail may be made therein without departing from the spirit and scope of the invention.

For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, wherein the non-volatile memory array includes a plurality of subdivisions, the method comprising:
    the controller storing write data within the non-volatile memory array utilizing a plurality of block stripes, wherein at least some of the plurality of block stripes have differing numbers of blocks and all of the blocks within each block stripe are drawn from different ones of the plurality of subdivisions;
    the controller determining a respective aggregate estimated remaining endurance across multiple blocks for each of the plurality of subdivisions based on both block health metrics and program/erase cycle counts of the blocks; and
    the controller building new block stripes for storing write data from blocks selected based on the aggregate estimated remaining endurances determined for the plurality of subdivisions, wherein the building includes:
        forming a new block stripe for write data of a given heat using blocks drawn from those of the plurality of subdivisions whose respective aggregate estimated remaining endurance satisfies a threshold and using no block from at least a particular subdivision for which the respective aggregate estimated remaining endurance does not satisfy the threshold, wherein blocks in the particular subdivision remain in active use for storing write data.

2. The method of claim 1, wherein the determining further comprises the controller determining the estimated remaining endurances of the blocks by reference to a plurality of endurance curves specified by a non-volatile memory operating model stored within the non-volatile memory array.

3. The method of claim 1, and further comprising:
    repetitively determining the block health metrics, wherein the block health metrics are based on measured bit error rates.

4. A method in a data storage system including a non-volatile memory array controlled by a controller, wherein the non-volatile memory array includes a plurality of subdivisions, the method comprising:
    the controller storing write data within the non-volatile memory array utilizing a plurality of block stripes, wherein at least some of the plurality of block stripes have differing numbers of blocks and all of the blocks within each block stripe are drawn from different ones of the plurality of subdivisions;
    the controller estimating remaining endurances of blocks in each of the plurality of subdivisions by reference to a plurality of endurance curves specified by a non-volatile memory operating model stored within the non-volatile memory array, wherein the determining includes:
        the controller selecting an endurance curve among the plurality of endurance curves based on a current value of a block health metric and current program/erase cycle count of a block;
        the controller determining the estimated remaining endurance of the block based on a subsequent program/erase cycle count at which the selected endurance curve reaches a threshold value of the block health metric, and
    the controller managing use of blocks in the plurality of subdivisions based on estimated remaining endurances of blocks in each of the plurality of subdivisions.

5. The method of claim 4, wherein the managing includes the controller skipping a particular subdivision when building a block stripe such that the subdivision does not contribute a block to the block stripe.

6. A data storage system, comprising:
    a controller configured to be coupled to a non-volatile memory array, wherein the controller is configured to store write data within the non-volatile memory array utilizing a plurality of block stripes, wherein at least some of the plurality of blocks have differing numbers of blocks and all of the blocks within each block stripe are drawn from different ones of the plurality of subdivisions, wherein the controller is configured to determine a respective aggregate estimate remaining endurance across multiple blocks for each of the plurality of subdivisions based on both block health metrics and program/erase cycle counts of the blocks, and wherein the controller is configured to build new block stripes for storing write data from blocks selected based on the aggregate estimated remaining endurances determined for the plurality of subdivisions, wherein the controller builds new block stripes by:

forming a new block stripe for write data of a given heat using blocks drawn from those of the plurality of subdivisions whose respective aggregate estimated remaining endurance satisfies a threshold and using no block from at least a particular subdivision for which the respective aggregate estimated remaining endurance does not satisfy the threshold, wherein blocks in the particular subdivision remain in active use for storing write data.

7. The data storage system of claim 6, wherein the controller is configured to determine the estimated remaining endurances of the blocks by reference to a plurality of endurance curves specified by a non-volatile memory operating model stored within the non-volatile memory array.

8. The data storage system of claim 6, wherein the controller is further configured to repetitively determine the block health metrics, wherein the block health metrics are based on measured bit error rates.

9. The data storage system of claim 6, and further comprising the non-volatile memory array coupled to the controller.

10. A data storage system, comprising:
a controller configured to be coupled to a non-volatile memory array, wherein the controller is configured to store write data within the non-volatile memory array utilizing a plurality of block stripes, wherein at least some of the plurality of block stripes have differing numbers of blocks and all of the blocks within each block stripe are drawn from different ones of the plurality of subdivisions, wherein the controller is configured to estimate remaining endurances of blocks by reference to a plurality of endurance curves specified by a non-volatile memory operating model stored within the non-volatile memory array, wherein the controller is configured to estimate the remaining endurances of the blocks by selecting an endurance curve among the plurality of endurance curves based on a current value of a block health metric and current program/erase cycle count of a block and by determining the estimated remaining endurance of the block based on a subsequent program/erase cycle count at which the selected endurance curve reaches a threshold value of the block health metric, and wherein the controller is configured to manage use of blocks in the plurality of subdivisions based on estimated remaining endurances of blocks in each of the plurality of subdivisions.

11. The data storage system of claim 10, wherein the controller is configured to manage use of blocks by skipping a particular subdivision when building a block stripe such that the subdivision does not contribute a block to the block stripe, based on estimated remaining endurances of blocks in each of the plurality of subdivisions.

12. A program product, comprising:
a storage device; and
program code stored in the storage device, wherein the program code, when executed by a controller that controls a non-volatile memory array of a data storage system, causes the controller to perform:
the controller storing write data within the non-volatile memory array utilizing a plurality of block stripes, wherein at least some of the plurality of block stripes have differing numbers of blocks of differing numbers of blocks and all of the blocks within each block stripe are drawn from different ones of the plurality of subdivisions;
the controller determining a respective aggregate estimated remaining endurance across multiple blocks for each of the plurality of subdivisions based on both block health metrics and program/erase cycle counts of the blocks; and
the controller building new block stripes for storing write data from blocks selected based on the aggregate estimated remaining endurances determined for the plurality of subdivisions, wherein the building includes:
forming a new block stripe for write data of a given heat using blocks drawn from those of the plurality of subdivisions whose respective aggregate estimated remaining endurance satisfies a threshold and using no block from at least a particular subdivision for which the respective aggregate estimated remaining endurance does not satisfy the threshold, wherein blocks in the particular subdivision remain in active use for storing write data.

13. The program product of claim 12, wherein the determining includes:
the controller determining the estimated remaining endurances of the blocks by reference to a plurality of endurance curves specified by a non-volatile memory operating model stored within the non-volatile memory array.

14. The program product of claim 12, wherein the program code causes the controller to perform:
repetitively determining the block health metrics, wherein the block health metrics are based on measured bit error rates.

15. A program product, comprising:
a storage device; and
program code stored in the storage device, wherein the program code, when executed by a controller that controls a non-volatile memory array of a data storage system, causes the controller to perform:
the controller storing write data within the non-volatile memory array utilizing a plurality of block stripes, wherein at least some of the plurality of block stripes have differing numbers of blocks and all of the blocks within each block stripe are drawn from different ones of the plurality of subdivisions;
the controller estimating remaining endurances of blocks in each of the plurality of subdivisions by reference to a plurality of endurance curves specified by a non-volatile memory operating model stored within the non-volatile memory array, and wherein the determining includes:
the controller selecting an endurance curve among the plurality of endurance curves based on a current value of a block health metric and current program/erase cycle count of a block;
the controller determining the estimated remaining endurance of the block based on a subsequent program/erase cycle count at which the selected endurance curve reaches a threshold value of the block health metric; and
the controller managing use of blocks in the plurality of subdivisions based on estimated remaining endurances of blocks in each of the plurality of subdivisions.

16. The program product of claim 15, wherein the managing includes the controller skipping a particular subdivision when building a block stripe such that the subdivision does not contribute a block to the block stripe.

\* \* \* \* \*